United States Patent
Bell, Jr. et al.

(10) Patent No.: US 8,347,124 B2
(45) Date of Patent: Jan. 1, 2013

(54) WORKLOAD POWER CONSUMPTION PROJECTION ON INFORMATION HANDLING SYSTEM

(75) Inventors: Robert Bell, Jr., Austin, TX (US); Donald DeSota, Austin, TX (US); Rajendra Panda, Austin, TX (US); Joseph Robichaux, Round Rock, TX (US); Venkat Indukuru, Austin, TX (US); Sameh Sharkawi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/650,928

(22) Filed: Dec. 31, 2009

(65) Prior Publication Data

US 2011/0154067 A1    Jun. 23, 2011

Related U.S. Application Data

(63) Continuation-in-part of application No. 12/643,060, filed on Dec. 21, 2009, now abandoned.

(51) Int. Cl.
*G06F 1/00* (2006.01)

(52) U.S. Cl. .................. 713/300; 713/320; 713/340

(58) Field of Classification Search .................. 713/300, 713/320, 340
See application file for complete search history.

(56) References Cited

U.S. PATENT DOCUMENTS

| | | | |
|---|---|---|---|
| 7,254,812 B1 | 8/2007 | Menezes | |
| 7,401,012 B1 | 7/2008 | Bonebakker et al. | |
| 2003/0125900 A1* | 7/2003 | Orenstien et al. | 702/132 |
| 2003/0191976 A1* | 10/2003 | Cyran et al. | 713/340 |
| 2005/0177327 A1* | 8/2005 | Banginwar et al. | 702/60 |
| 2005/0257078 A1* | 11/2005 | Bose et al. | 714/1 |
| 2007/0198864 A1* | 8/2007 | Takase | 713/300 |
| 2007/0220292 A1* | 9/2007 | Ishihara et al. | 713/320 |
| 2009/0007128 A1* | 1/2009 | Borghetti et al. | 718/104 |
| 2009/0198385 A1* | 8/2009 | Oe et al. | 700/296 |

\* cited by examiner

*Primary Examiner* — Vincent Tran
(74) *Attorney, Agent, or Firm* — Joscelyn Cockburn

(57) ABSTRACT

The projected power consumption for an application program running on a future IHS is determined by generating a power proxy for the application program, and power proxies for a plurality of standard benchmarks. An algorithm correlates the power proxy for the application program, and the power proxies for the standard benchmarks to generate weighted surrogates that are combined with power proxies derived from running the benchmark surrogates on the future IHS to generate the projected power consumption.

19 Claims, 4 Drawing Sheets

WORKLOAD POWER CONSUMPTION PROJECTION ON INFORMATION HANDLING SYSTEM

CROSS-REFERENCE TO RELATED PATENT APPLICATION

This application is a continuation-in-part of application Ser. No. 12/643,060 filed on Dec. 21, 2009 now abandoned and entitled "WORKLOAD POWER CONSUMPTION PROJECTION ON INFORMATION HANDLING SYSTEM (IHS)" which is incorporated by reference herein for all purposes.

BACKGROUND OF THE INVENTION

The present invention relates to Information Handling System (IHS), in general, and in particular to determining the power consumption of a software product running on an IHS.

Power consumption has become a major issue for Government and commercial enterprises as a significant added cost in the activities of the enterprises. Computer software, running on an IHS, is one of the many activities contributing to the overall energy consumption. Even though the contribution of a single program may be miniscule when the total power consumption is taken into consideration, there are a large number of software products running on all types of IHS, and the aggregate power consumption of these products can be relatively high. In order to determine the effect of software products on total energy consumption, a technique, and a mechanism are required to make an accurate, and a reliable projection on the power consumption of the software products.

Commercial enterprises are generally concerned with the energy consumption of software application products that will be run on future IHS, that they may be planning to purchase. Oftentimes, a buyer of a future IHS may ask the vendor to provide a power projection analysis for a particular software product. The particular software product may be that of the buyer or that of a third party. This request puts pressure on the vendor to make sure the information that is given to the buyer is accurate and reliable. This is particularly important if the power consumption projection is inserted in the sales agreement. If the product fails to meet the terms of the power consumption projection, the vendor could be liable for whatever loss the buyer suffers as a result of the product failing to perform according to the power projection analysis. The loss to the vendor could be very high, especially on very expensive IHS products. To minimize the potential exposure, the vendor may provide a very conservative power projection estimate or an estimate that includes a lot of conditions. Oftentimes, the buyer wants straight-forward estimates, and an estimate that is too conservative and/or contains too many contingencies could result in loss of business to the vendor.

Another likely scenario occurs when a customer has limited power in its data center. In this case, the power projection must determine the number of nodes that a customer can use. If the power estimate is over estimated, the size of the system will be smaller since the estimated power use per node is too high, in comparison to what it could have been had the power per node estimate been correct, resulting in lower application performance. On the other hand, if the power projection estimate is under estimated the customer may not be able to power all the nodes. In either case the customer could be unhappy which is not good for business.

Estimating power consumption of an application program on future system can be complex, time consuming, and sometimes impossible. Many hurdles have to be overcome in order to set up and extract meaningful information on the projected power consumption of the application program. In the past, projections have been based on general estimates, ad hoc determination, and intuition from experience but these techniques can lead to large errors in system cost estimates. Another approach uses aggregate power measurements over many benchmarks but this technique could encompass an error range in excess of 50%, in projection for an individual application. Still another approach uses detailed analysis of application characteristics projecting to future systems but this is a tedious time consuming process that often does not yield good results. In yet another approach estimates are based upon company's literature or academic papers which are often inaccurate.

SUMMARY OF THE INVENTION

The projected power consumption of an application program that is to be run on a future IHS is determined by generating benchmark surrogates for the application program and actual power consumption of the benchmark surrogates that are run on the future IHS. The benchmark surrogates and the actual power consumption of the surrogates are combined to provide the total power consumption of the application program.

DETAILED DESCRIPTION OF AN EMBODIMENT

Figure 1:
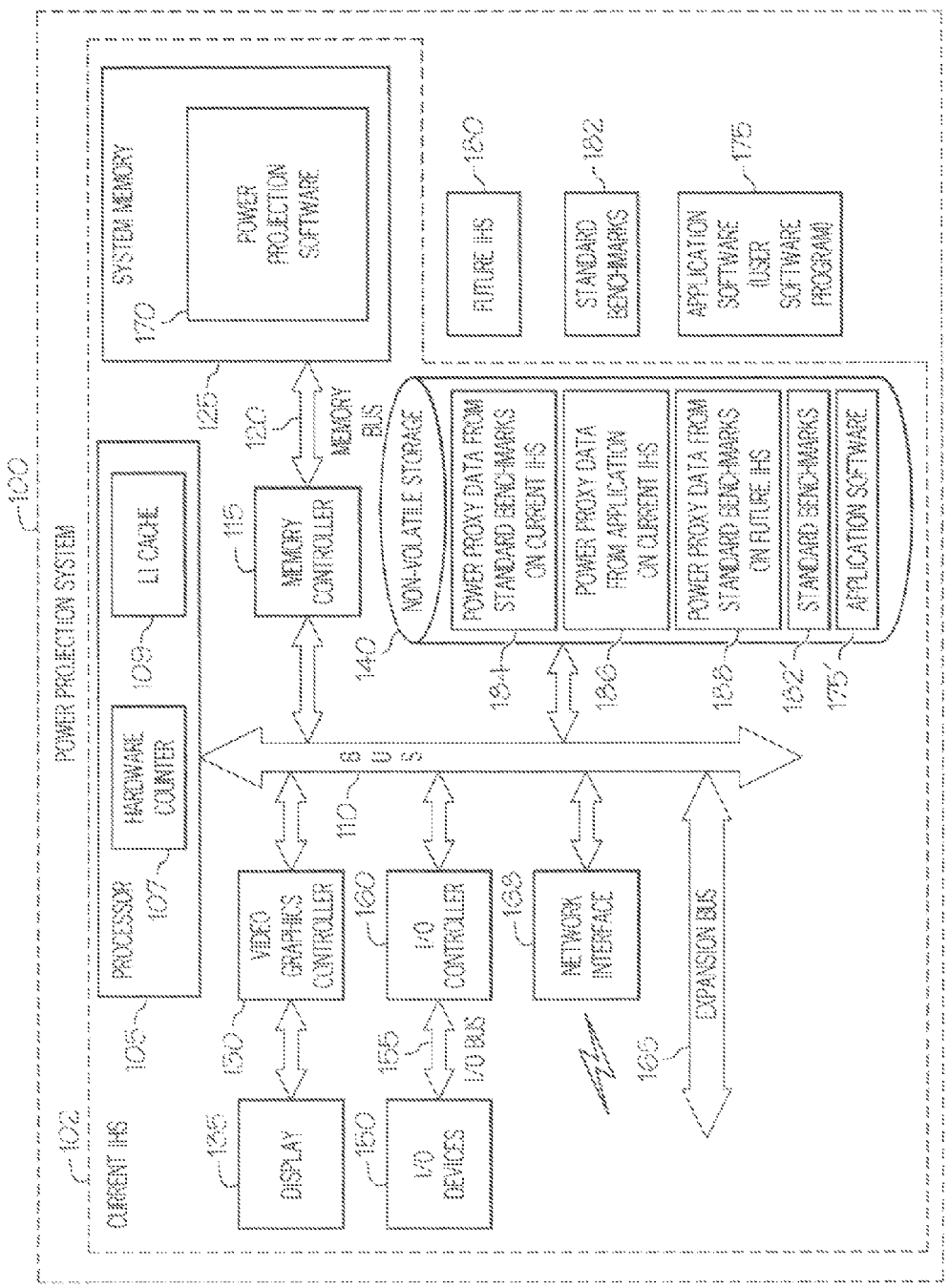
FIG. 1 depicts a block diagram for a power consumption projection system according to teachings of an embodiment of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An embodiment of the present invention uses benchmark surrogates, and actual power consumption of the surrogates, running on a future IHS or a simulated model of the future IHS, to determine the power consumption projection of a software application program running on said future IHS. In particular, the software application program whose power consumption projection is required is run on an existing IHS. Micro architecture dependent counter data is collected, and is used to calculate a power proxy for the software application program. A power proxy is an accurate estimate of hardware power consumption in a specific component in a chip (e.g. L1 cache) determined using the activity in that specific component as indicated by hardware counters. The current generations of microprocessors provide mechanisms to monitor hardware activity in different parts of the chip via counters. A plurality of standard benchmark programs or a standard benchmark product containing a suite of programs (such as SPEC 2006) is run on the existing IHS. A power proxy is calculated for each benchmark programs based on micro architecture dependent counter data collected for each benchmark programs, as it runs on the existing IHS. A first algorithm correlates the power proxy for the software application program with power proxies for the benchmark programs to generate surrogates based on the relationship between the power proxy for the application program, and power proxies for the benchmark programs in Euclidean space. The benchmark programs are run on a future IHS or a simulated model of said future IHS. The power consumption of selected ones of the benchmark programs is determined, and combined with the weighted surrogates to generate the projected power consumption for the software application program.

FIG. 1 depicts a power projection system 100 that integrated circuit (IC) designers, and other entities may employ as a benchmarking tool for predicting power consumption on an existing and/or future Information Handling System (IHS). Power projection system 100 includes a current IHS 102 having a processor 105 that includes a hardware (HW) counter 107 and an L1 cache 109. Processor 105 is coupled to a bus 110. A memory controller 115 couples a system memory 125 to bus 110 via a memory bus 120. A video graphics controller 130 couples a display 135 to bus 110. Current IHS 102 also includes nonvolatile storage 140, such as a hard disk drive, CD drive, DVD drive, or other nonvolatile storage, that couples to bus 110 to provide power projection system 100 with permanent storage of information. System memory 125, and nonvolatile storage 140 are each a form of data store. I/O devices 150, such as a keyboard, and a mouse pointing device, couple via I/O bus 155, and an I/O controller 160 to bus 110. Processor 105, system memory 125, and devices that are coupled to bus 110 together form current IHS 102 within power projection system 100. The other components of power projection system 100 include future IHS 180, standard benchmarks 182, and application software 175 which could be a user software application program hereafter termed target software application program. The contribution of each of the named components to the power projection determination will be described in greater detail below.

Still referring to FIG. 1, one or more expansion buses 165, such as USB, IEEE 1394 bus, ATA, SATA, PCI, PCIE, and other buses, are coupled to bus 110 to facilitate the connection of peripherals, and other devices to current IHS 102. A network interface 168 couples to bus 110 to enable current IHS 102 to connect by wire or wirelessly to other network devices. Current IHS 102 may take many forms. For example, current IHS may take the form of a desktop, server, portable, laptop, notebook, or other form factor computer or data processing system. Current IHS 102 may also take other form factors such as a personal digital assistant (PDA), a gaming device, a portable telephone device, a communication device or other devices that include a processor and memory.

Still referring to FIG. 1, a user or other entity loads software such as STANDARD BENCHMARKS 182, APPLICATION SOFTWARE 175, and POWER PROJECTION SOFTWARE 170 into IHS 102. The STANDARD BENCHMARKS, a suite of benchmark programs such as SPEC 2000, are identified with numeral 182 prior to loading into IHS 100, and 182' after loading. Likewise, APPLICATION SOFTWARE 175 is identified with numeral 175 before loading into IHS 102, and 175' after loading. POWER PROJECTION SOFTWARE 170 includes the instructions that cause processor 105 to perform according to teachings of an embodiment of the present invention. As a consequence, POWER PROJECTION SOFTWARE 170 is shown loaded in SYSTEM MEMORY 125, but PROCESSOR 105 can move it from SYSTEM MEMORY 170 to NON-VOLATILE STORAGE 140, and vice versa. Likewise, PROCESSOR 105 can move software such as APPLICATION SOFTWARE 175' or STANDARD BENCHMARKS 182' from NON-VOLATILE STRORAGE 140 into SYSTEM MEMORY 125, and vice versa. The PROCESSOR 105 runs the Standard Benchmarks, generates Power Proxy Data 184, and loads it onto NON-VOLATILE STORAGE 140. The PROCESSOR 105 also runs the APPLICATION SOFTWARE, generates Power Proxy Data 186, and loads it onto NON-VOLATILE STORAGE 140. The FUTURE IHS 180 runs the STANDARD BENCHMARKS, generates Power Proxy Data 188, and loads it onto NON-VOLATILE STORAGE 140. The FUTURE IHS 180 can be a simulated model of the FUTURE IHS whose power consumption, while running an application program is desired to be known. As will be explained in greater detail below, the POWER PROXIES are used as surrogates which are used to predict the future power consumption of a particular application program running on the FUTURE IHS 180.

Figure 2:
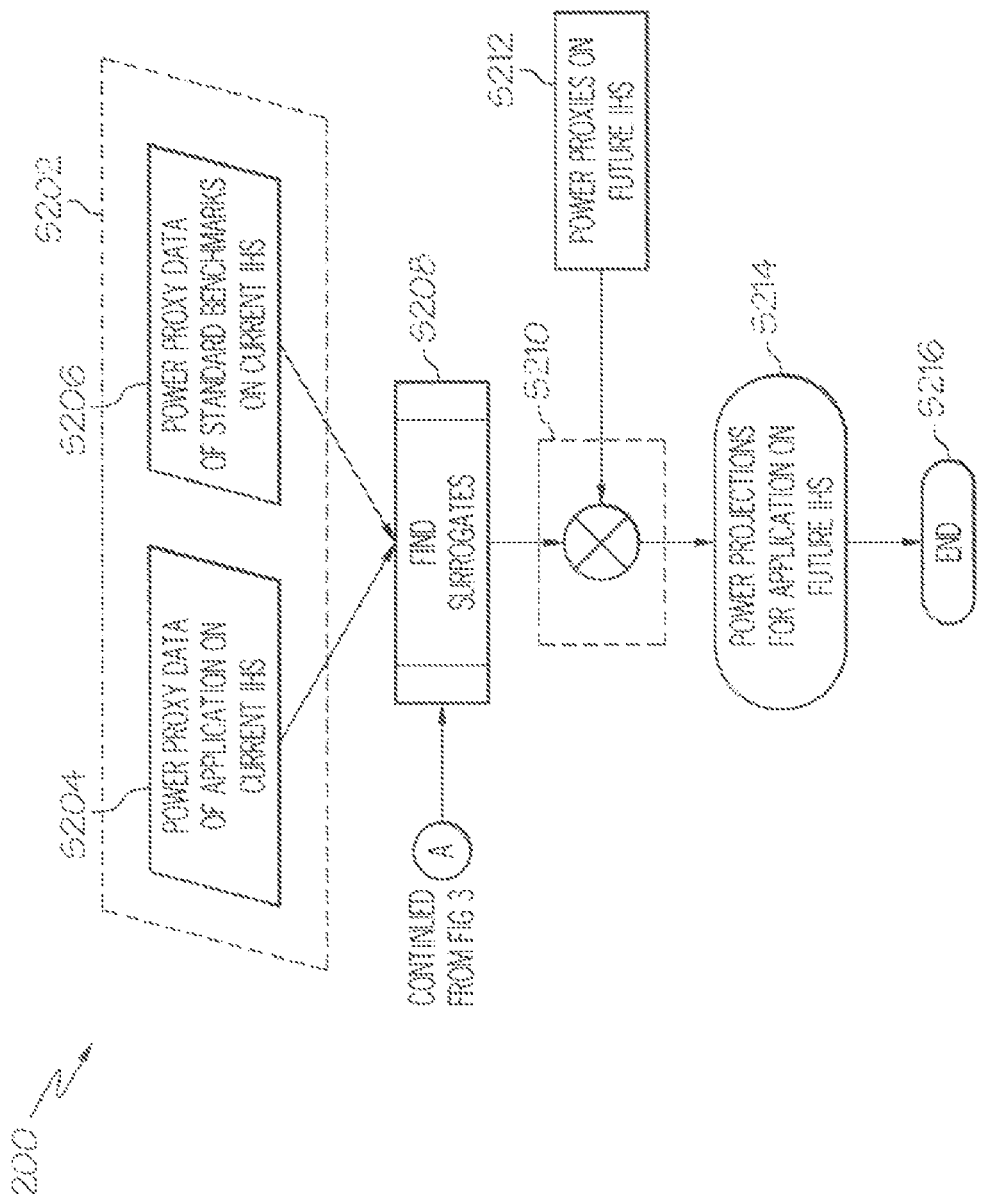
FIG. 2 depicts a high level flow chart for a method that determines power consumption projection for a software application program.

FIG. 2 is a high level flow chart of the method, according to teachings of an embodiment of the present disclosure, that determines the power consumption for a software application program which could be a user's application program running on a future IHS. Oftentimes, the need for accurate power consumption data occurs before the IHS is publicly available. An embodiment of the present invention provides a suite of software programs, running on a power projection system, and a methodology that provide accurate power consumption data for a user's application program running on a future IHS. With reference to FIG. 2, the process 200 begins in block S202 where a Power Proxy for the user's application program is generated in block S204 and Power Proxies for the standard benchmarks are generated in block S206. The power proxies represent a non-intrusive way to measure or calculate how much power is being consumed, using hardware performance counters, without actually measuring it. From block S202, the method proceeds to block S208 where surrogates for the user's application program are generated. As will be explained in greater details hereafter, this embodiment of the disclosure maps standard benchmarks to an application that could be a user's application program based on power characteristics. The mapped standard benchmarks that are described in greater details below are termed Surrogates. In block S212, the mapped standard benchmarks are run on the FUTURE IHS 180 if available or a simulated version of it. The Power Proxies representative of actual power consumed by the mapped standard benchmarks are collected, and correlated in block S210 with data relating to benchmark Surrogates output from block S208. The method then enters block S214 whereat the total power projection consumption for the application program is made available, and the method terminates in block S216. The methodology that is used to map the application workload and benchmark programs are described in detail below.

Still referring to FIG. 2, a review of the characteristics of the data output from block S208, and block S212 may be helpful in understanding an embodiment of the present disclosure. With respect to block S212, the data provided for the mapped benchmarks are in power units such as watts. The data generated from block S208 is mixed in that it identifies the mapped benchmarks closest to the application in Euclidian space, and the percentage of closeness. By combining in block S210 the information from block S212, and block S208 a mathematical expression can be derived to calculate the total power consumption of the user's application program running on the future IHS. A simple example can illustrate the process. Suppose the algorithm at block S208 indicates that three standard benchmarks A, B, and C are surrogates. It is further determined that the percentage match for A is 40. the percentage match for B is 30, and the percentage match for C is 20. It is also determined that the power consumption output from block S212 for standard benchmarks A, B, and C are 300, 600, and 900 watts, respectively. Then by combining the information from block S208, and block S212, the total power consumption would be 40% of 300+30% of 600+20% of 900=480 watts.

Figure 3:
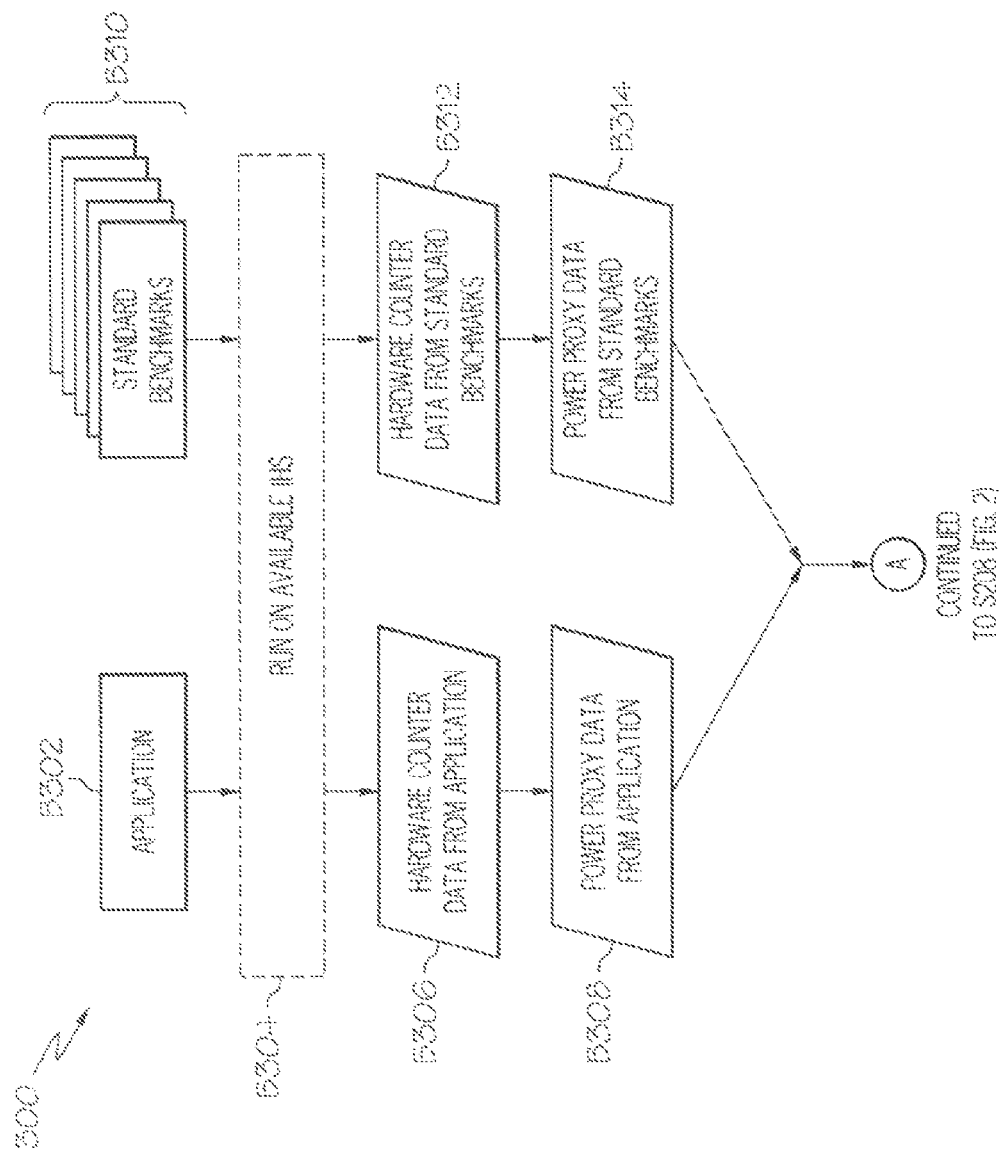
FIG. 3 depicts a flow chart of a method that generates power proxies for the software application program and standard benchmark programs.

FIG. 3 depicts a flow chart of process 300 that generates the Power Proxy for the application whose power consumption on a future system is required, and the Power Proxies for the STANDARD BENCHMARKS. The generation of a Power Proxy for the Application in block B302 begins by running the Application on any available IHS such as the CURRENT IHS previously described. In block B306, the hardware counters in the available IHS collect pre-defined data, such as the memory bandwidth consumed, cycles per instructions, or instructions dispatched, etc. as the application is run. In block B308, the Power Proxies are generated from the data so collected, and are used to generate surrogates.

Still referring to FIG. 3, the Power Proxies for the Standard Benchmarks are determined by running the Standard Benchmarks B310 on the available IHS block B304 as was done for the Application discussed above. The benchmarks may be individual programs or it could be a suite of programs such as SPEC 2000 available from the wwwspec.org website. In block B312, the hardware counters in the available IHS collect pre-defined data for each benchmark programs. In block B314, a Power Proxy is generated for each benchmark programs based on the pre-defined data collected in block B312.

Figure 4:
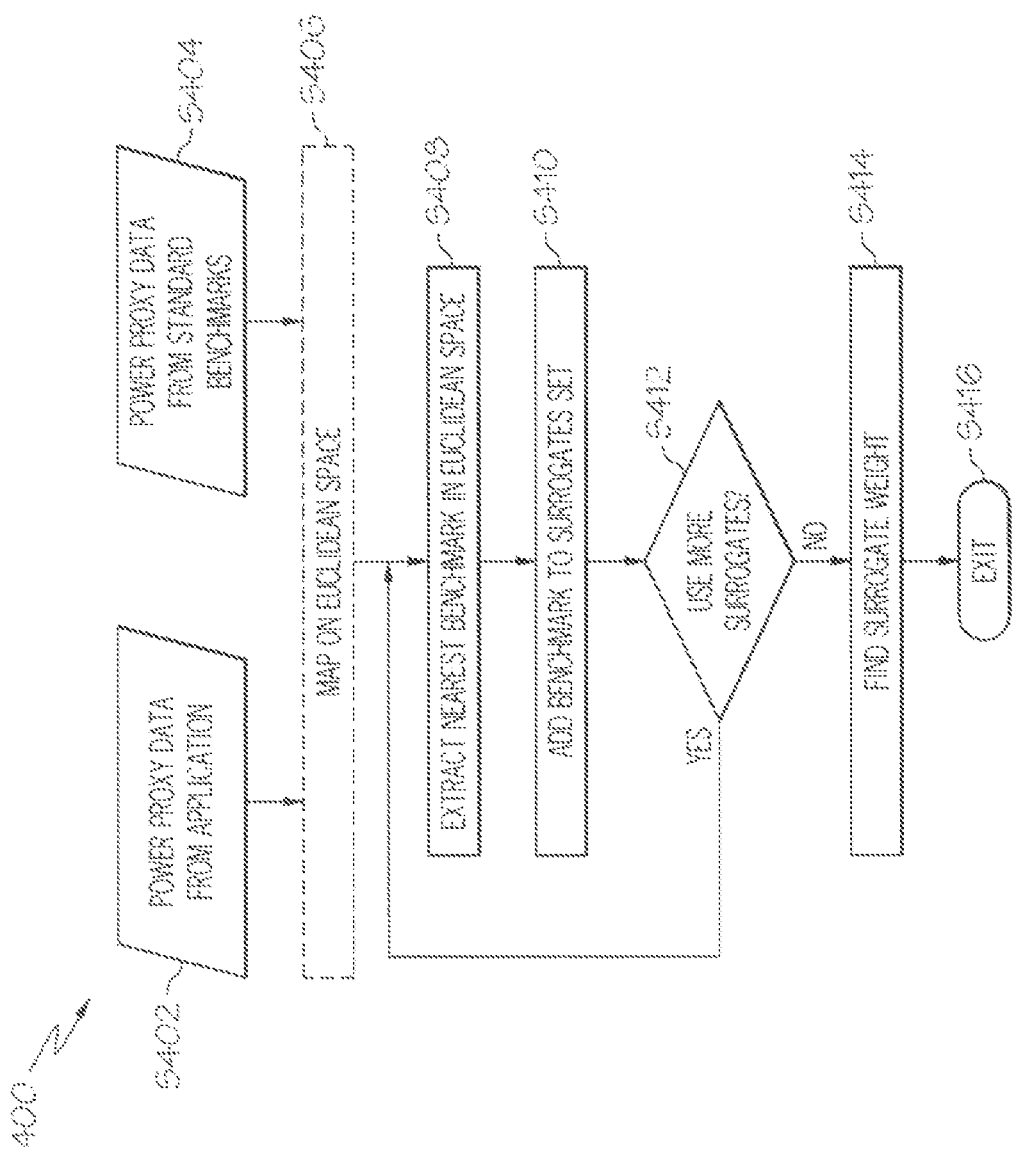
FIG. 4 depicts a flow chart of the algorithm that generates surrogates based on correlating the power proxy for the software application program and power proxies for a plurality of standard benchmark programs.

FIG. 4 depicts a flow chart for process 400 that generates Surrogates from the Power Proxies. The process begins at blocks S402, and S404, respectively. At block 402 the Power Proxy Data from the Application whose power projection is desired is mapped on Euclidean space 406. Likewise, Power Proxy Data from standard benchmarks are mapped on Euclidean space 406. Based on the relationship between the mapped Power Proxy for the Application, and the mapped Power Proxies for the benchmarks in Euclidean space, the benchmarks closest to the Application are extracted, block S408, and added to the set of surrogates, block S410. The process then enters block S412, and loops back to block S408, if there are additional Surrogates to be processed. If at block S412 there are no more Surrogates to be processed, the program finds the Surrogate weight block S 414, and exits at block S416. Preferably, the Surrogate weight is provided as a percentage such as those described in the above examples.

The total power consumption of a workload (application program or a standard benchmark) can be represented as a sum of power consumptions in each of the various components in an IHS. By using power proxies as accurate estimates of power consumption in different components, the total power consumption may be represented by an equation like the one below.

$$P_{Total} = P_{L1} + P_{L2} + P_{FPU} + P_{IFU} + \ldots + P_{DIMM} \quad (1)$$

Where the power proxies $P_{L1}$, $P_{L2}$, $P_{FPU}$, $P_{IFU}$, $P_{DIMM}$ in the various components of an IHS are represented as a function of the degree of activity given by the hardware counters $H_{L1}$, $H_{L2}$, $H_{FPU}$, $H_{IFU}$, $H_{DIMM}$ in the same components of the IHS. In the equations below, a, b, c, d, e, ..., etc. are constants.

$$P_{L1} = a * H_{L1}$$

$$P_{L2} = b * H_{L2}$$

$$P_{FPU} = C * H_{FPU}$$

$$P_{IFU} = d * H_{IFU}$$

$$P_{DIMM} = e * H_{DIMM}$$

If, as in the above equation (1), the total power consumption, in general, is a combination of n power proxies, then the total power consumption can be represented as a point in the n-dimensional space where each coordinate represents a specific type of a power proxy. This n-dimensional space is also called Euclidean space, and the representation of total power in this space is called mapping. Conceptually, the mapped application program and the mapped benchmark programs are represented as a galaxy of points in the n-dimensional Euclidean space. Points that are closest to the point that represents the application whose power consumption projection is desired to be known is determined. The determination is made by generating a distance metric that gives the distance between two points in space. A threshold is established and points that fall within the threshold are deemed to be Surrogates of the application. The threshold is arbitrary and may be any percentage chosen by the designer or other entity. For example, the choice may be points that fall within 5% of the application workload. In this case points within the threshold would be selected as Surrogates which are then weighted based upon the closeness of each to the point representing the application whose power consumption projection is desired to be known. Determination of the surrogates, and the corresponding weights of their power consumptions are stored in the nonvolatile storage to be used in a subsequent step of power projection.

The flowchart and block diagrams in the FIGS. 1 through 4 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A program product comprising:
a non-transitory computer readable medium encoded with a computer program, said computer program including a first module with instructions that cause at least one counter in a processor to count activities occurring in a software program during execution said processor, to count activities occurring in standard benchmarks during execution on said processor, and to generate power proxies based on said count of activities in said software program and the count of actives in the standard benchmarks; and
a second module with instructions that cause the processor to surrogates based on the power proxies.

2. The method of claim 1 wherein determining surrogates include generating a Power Proxy for the software program;
generating Power Proxies for the selected set of benchmark programs; and
correlating the Power Proxy for the software program with the Power Proxies for the selected set of benchmark programs to generate surrogates.

3. The method of claim 2 wherein generating the Power proxy for the software program further includes providing an existing Information Handling System (IHS);
providing hardware counters in said IHS;
running the software program on said IHS;
collecting pre defined data in said counters while the software program is running; and
using the pre defined data collected to generate the Power Proxy for said software program.

4. The method of claim 2 wherein generating Power Proxies for the set of benchmark programs further include providing an existing IHS;
providing hardware counters in said existing IHS;
running the set of benchmark programs on said existing IHS;
collecting pre defined data for each of the benchmark programs while said each of the benchmark program is running; and
using the data so collected to determine a Power Proxy for each of the benchmark programs.

5. The method of claim 3 wherein the pre defined data includes architecture dependent data.

6. The method of claim 4 wherein the pre defined data includes architecture dependent data.

7. The method of claim 2 wherein correlating the Power Proxy for the software program and Power Proxies for the set of benchmark programs comprise mapping Power Proxy data for said software program on Euclidean Space;
mapping Power Proxy data for each benchmark program on Euclidean space; and
identifying Power Proxies for benchmark programs nearest to the Power Proxy for said software program in Euclidean space as surrogates for said.

8. The method of claim 7 further including determining a weight for each of the surrogates so determined.

9. The method of claim 8 wherein the weight for each of the surrogates is expressed as a percentage.

10. The method of claim 1 wherein the visual representation includes printed matter.

11. The method of claim 1 wherein the visual representation includes displaying projected power consumption data on a monitor.

12. The method of claim 1 wherein the actual power consumption is expressed in units of power, including watts.

13. A system comprising:
   a system memory;
   a software program loaded in said system memory;
   a non-volatile storage;
   a suite of standard benchmarks loaded on said non-volatile storage;
   an application program loaded on said non-volatile storage;
   power proxy data loaded on said non-volatile storage, wherein said power proxy data is derived from executing selected ones of the standard benchmarks on a future Information Handling System (HIS);
   a processor operatively coupled to the system memory and the non-volatile storage; and
   at least one hardware counter located within the processor wherein said processor in response to instructions extracted from said software program collects pre-defined data while running said application program, collects pre-defined data while running the standard benchmarks, using the pre-defined data so collected to generate a power proxy for the application program, and a power proxy for each of the standard benchmarks, and generate a power consumption projection for said application program based on the power proxy data and surrogates.

14. The system of claim 13 including said processor generating the surrogates for said application program based on the power proxy for the application program and the power proxy for at least one of said standard benchmarks.

15. The system of claim 14 wherein the surrogates are generated based on the relation between the power proxy for the application program and the power proxy for each of the standard benchmarks in Euclidean space.

16. The system of claim 14 further including said processor generating weighted surrogates from the surrogates.

17. The system of claim 16 further including
   said processor combining the weighted surrogates, and the power proxy data provided by the future IHS to generate the power consumption projection for said application program.

18. A program product comprising:
   a tangible computer readable medium encoded with a computer program, said computer program including a first module with instructions that cause at least one counter in a processor to count activities occurring in a software program during execution on said processor, to count activities occurring in standard benchmarks during execution on said processor, and to generate power proxies based on said count of activities in said software program and the count of actives in the standard benchmarks; and
   a second module with instructions that cause the processor to generate surrogates based on the power proxies.

19. The program product of claim 18 further including a third module with instructions that cause the processor to generate a power consumption projection for an application program based on weighted surrogates and actual power consumption of benchmarks, relating to said surrogates, running on a future IHS.

* * * * *